(12) United States Patent
Hidaka et al.

(10) Patent No.: US 7,042,700 B2
(45) Date of Patent: May 9, 2006

(54) ELECTRONIC COMPONENT

(75) Inventors: Akio Hidaka, Miyazaki (JP); Yuichi Murano, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 10 days.

(21) Appl. No.: 10/980,770

(22) Filed: Nov. 4, 2004

(65) Prior Publication Data

US 2005/0128678 A1    Jun. 16, 2005

(30) Foreign Application Priority Data

Dec. 11, 2003  (JP) .............. 2003-413000
Apr. 22, 2004  (JP) .............. 2004-126627

(51) Int. Cl.
*H01G 4/00* (2006.01)

(52) U.S. Cl. .............. 361/301.3; 361/303; 361/311; 361/313; 361/523; 361/528

(58) Field of Classification Search ........... 361/301.3, 361/303, 306.1, 306.3, 311, 313, 321.1, 321.5, 361/523, 528, 328, 525
See application file for complete search history.

(56) References Cited

U.S. PATENT DOCUMENTS

| 4,617,609 | A | 10/1986 | Utner et al. |
| 4,734,819 | A | 3/1988 | Hernandez et al. |
| 4,748,537 | A | 5/1988 | Hernandez et al. |
| 4,959,505 | A | 9/1990 | Ott |
| 5,420,745 | A | 5/1995 | Hidaka et al. |
| 5,466,887 | A | 11/1995 | Hasegawa |
| 5,712,758 | A | 1/1998 | Amano et al. |
| 5,883,780 | A | 3/1999 | Noji et al. |
| 5,889,445 | A | 3/1999 | Ritter et al. |
| 6,046,507 | A | 4/2000 | Hatchard et al. |
| 6,316,726 | B1 | 11/2001 | Hidaka et al. |
| 6,465,320 | B1 * | 10/2002 | McNeil et al. .............. 438/396 |
| 6,477,030 | B1 | 11/2002 | Hidaka et al. |
| 6,730,183 | B1 * | 5/2004 | Tokuda et al. ........... 156/89.12 |
| 6,822,312 | B1 * | 11/2004 | Sowlati et al. .............. 257/532 |
| 6,870,727 | B1 * | 3/2005 | Edson et al. ................ 361/523 |
| 6,934,145 | B1 * | 8/2005 | Hsieh et al. ............. 361/321.2 |
| 2002/0080550 | A1 | 6/2002 | Hidaka et al. |

FOREIGN PATENT DOCUMENTS

DE         90 12 638       12/1990

(Continued)

OTHER PUBLICATIONS

Patent Abstracts of Japan, vol. 2002, No. 02, Apr. 2, 2002, & JP 2001 284192 A (Sanyo Electric Co., Ltd.; Sanyo Electronic Components Co., Ltd.), Oct. 12, 2001, Abstract.

(Continued)

*Primary Examiner*—Nguyen T. Ha
(74) *Attorney, Agent, or Firm*—Wenderoth, Lind & Ponack, L.L.P.

(57) ABSTRACT

An electronic component is provided which has a plurality of elements, a pair of terminal parts which are disposed on the element, and an armoring material which covers the elements and a part of the terminal parts. The electronic component has a configuration such that the plurality of elements are disposed in the armoring material at a predetermined interval, and a guiding part for guiding the armoring material toward an opposed region of the element is disposed on opposed surfaces between the elements.

25 Claims, 11 Drawing Sheets

FOREIGN PATENT DOCUMENTS

| | | |
|---|---|---|
| EP | 1 160 809 | 12/2001 |
| JP | 58-56431 | 4/1983 |
| JP | 61-27327 | 2/1986 |
| JP | 61-129322 | 8/1986 |
| JP | 5-101975 | 4/1993 |
| JP | 5-109580 | 4/1993 |
| JP | 5-109581 | 4/1993 |
| JP | 5-135991 | 6/1993 |
| JP | 5-299290 | 11/1993 |
| JP | 6-163315 | 6/1994 |
| JP | 6-196348 | 7/1994 |
| JP | 2678099 | 7/1997 |
| JP | 2000-216045 | 8/2000 |
| JP | 2001-110691 | 4/2001 |
| JP | 2002-25852 | 1/2002 |
| JP | 2002-43166 | 2/2002 |
| JP | 2002-43170 | 2/2002 |
| JP | 2002-313669 | 10/2002 |

OTHER PUBLICATIONS

Patent Abstracts of Japan, vol. 018, No. 499 (E-1607), Sep. 19, 1994, & JP 06-168854 (NEC Corp.), Jun. 14, 1994, Abstract.

Patent Abstracts of Japan, vol. 2000, No. 21, Aug. 3, 2001, & JP 2001 110691 (Rohm Co. Ltd.), Apr. 20, 2001, Abstract.

Patent Abstracts of Japan, vol. 2002, No. 06, Jun. 4, 2002, & JP 2002 043170 A (Murata MFG. Co., Ltd.), Feb. 8, 2002, Abstract.

* cited by examiner

ELECTRONIC COMPONENT

FIELD OF THE INVENTION

This invention relates to an electronic component which is suitably used for electronic devices etc. such as modems, power supply circuits, power supplies for use in liquid crystal displays, DC—DC converters, and power line communication devices.

BACKGROUND OF THE INVENTION

In electronic devices such as modems and power supply circuits, a number of electronic components are incorporated. For example, capacitors are likely to be used for noise elimination, for cutting off a DC component of signals, and so on.

Generally speaking, miniaturization and low-cost are desirable for electronic devices. Accordingly, significant miniaturization and low-cost are also desirable for electric components. For the purpose of reducing a mounting cost by the use of automatic mounting and reducing a mounting area, surface mount type electronic components are often utilized. Conflicting specifications are often desired, however, such as high performance, reduction of fluctuations in characteristics, and improvement of endurance, in addition to miniaturization.

Due to advent of LSI with a large number of pins, etc., and increase of signal lines, it has become necessary to mount a plurality of electronic components with high-density, in a place where an interval of wiring is very narrow.

In particular, data output and data input are likely to be a set in modems etc., and in that case, it is necessary to mount two electronic components.

In order to satisfy these requirements, various electronic components have been proposed in Japanese Patent Laid Open No. 2001-110691 and 2002-43170.

However, conflicting problems are produced for the accomplishment of miniaturization and high performance, and to accomplish them simultaneously produces technically difficult problems.

For example, in order to reduce fluctuations of performance and characteristics, or to improve endurance, an electronic component molded with an armoring material made of resin etc. has been proposed. However, in a case that a plurality of electronic components of this type are intended to be mounted, there is a problem of size increasing since the electronic components are molded. There are also problems of a substrate increasing in size due to wiring layout, and radiation or signal delay due to the wiring layout.

On the contrary, in a case that bare electronic components, which are not molded, are mounted adjacently, for the purpose of realizing miniaturization and high-density mounting, it causes problems of short-circuiting or cross talk of signals, due to generation of electric field coupling between electronic components.

In particular, in capacitors as capacitance elements, electric field coupling is generated between adjacent capacitors, and cross talk etc. is easily generated, and it also becomes a cause of noises. In a circuit substrate of an electronic equipment in which an input and an output are likely to be paired wirings, these are very important problems.

In a case that a plurality of elements are molded with armoring material, in order to solve these problems, when there is filling failure of the armoring material as resin between the elements, it causes such a problem that a withstand voltage between the elements is lowered. In addition, there is also a problem in endurance to a heat cycle, etc., in a case that an interval between the elements is small. In a case that the interval between elements is enlarged in order to avoid these problems, it becomes impossible to realize miniaturization, and therefore, miniaturization of electronic devices is prevented.

SUMMARY OF THE INVENTION

An object of this invention is to solve the above-described problems, and to provide an electronic component which realizes conflicting specifications such as miniaturization of an electronic device, high-density mounting, high performance, reduction of fluctuation, and improvement of endurance, simultaneously.

In order to accomplish the above-described object, an electronic component of this invention has a plurality of elements, a pair of terminal parts which are disposed in the element, and an armoring material member which covers at least a part of the element and the terminal part, wherein a length P1, a width P2, and a height P3 of the armoring material is in the range of:

3.2 mm $\leq$ P1 $\leq$ 7.1 mm
2.5 mm $\leq$ P2 $\leq$ 6.3 mm
1.5 mm $\leq$ P3 $\leq$ 2.4 mm.

DETAILED DESCRIPTION OF THE EXEMPLARY EMBODIMENTS

Figure 1:
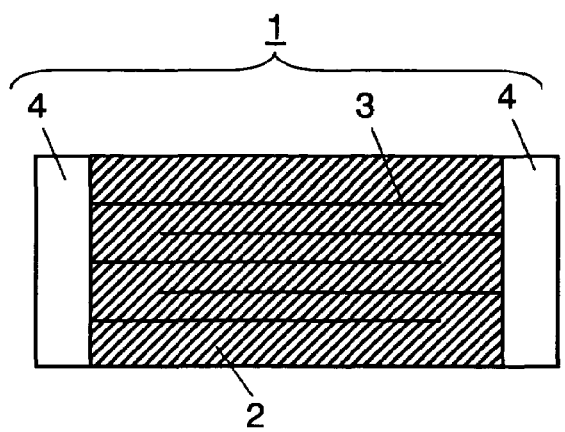
FIG. 1 is a side view of a multilayer type capacitor according to an exemplary embodiment of the present invention.

In this specification, the present invention will be described by use of a multilayer type capacitor as an example, but this invention is not limited to this. The present invention may include various elements such as a normal capacitor which is not laminated, and a resistor. The present invention may also be a single plate capacitor.

Hereinafter, the present invention will be described by use of the drawings.

Embodiment 1

In the figures, reference numeral 1 designates a multilayer type capacitor; reference numeral 2 designates a dielectric base body of the capacitor 1; reference numeral 3 designates inner electrodes of the capacitor 1; reference numeral 4 designates terminal parts of the capacitor 1; reference numerals 5, 6 designate lead terminals; reference numeral 7 designates an electronic component; reference numeral 8 designates an armoring material; reference numeral 9 designates an opposed region; reference numeral 10 designates a chamfer; reference numeral 11 designates a non-parallel part; reference numeral 12 designates an arc part; reference numeral 13 designates an opposed distance; reference numerals 14, 15 designate mounted components; reference numerals 16, 17 designate circuit substrates; and reference numerals 18, 19 designate wirings.

Figure 7A:
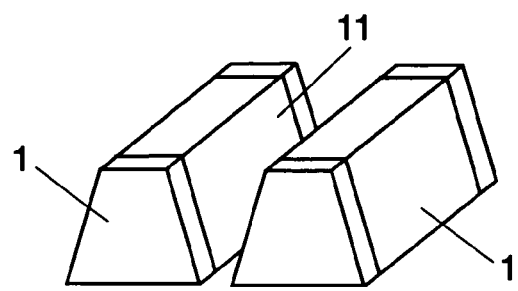
FIG. 7A is a perspective view which shows an arrangement and a shape of a multilayer type capacitor according to an exemplary embodiment of the present invention.
Figure 7B:
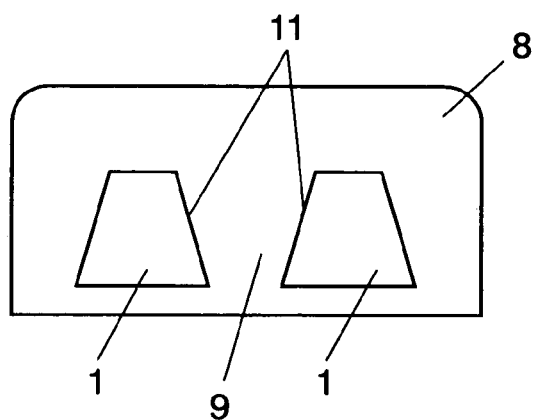
FIG. 7B is a cross-sectional view of an electronic component which is configured by the multilayer type capacitor shown in FIG. 7A.
Figure 7C:
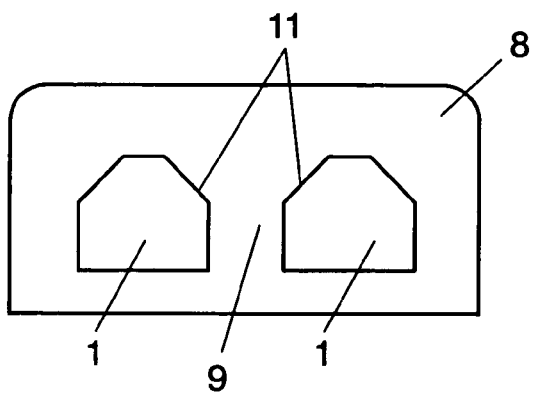
FIG. 7C is a cross-sectional view of the electronic component in the case that a shape of the multilayer type capacitor shown in FIG. 7A is modified.
Figure 8A:
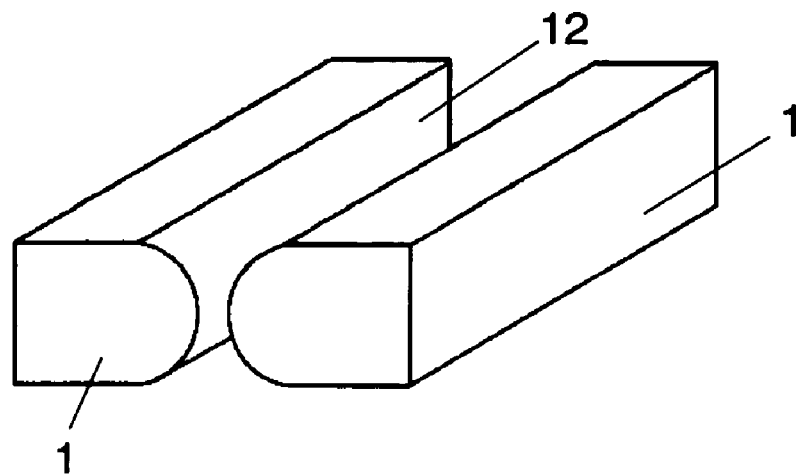
FIG. 8A is a perspective view which shows an arrangement and a shape of a multilayer type capacitor according to an exemplary embodiment of the present invention.
Figure 8B:
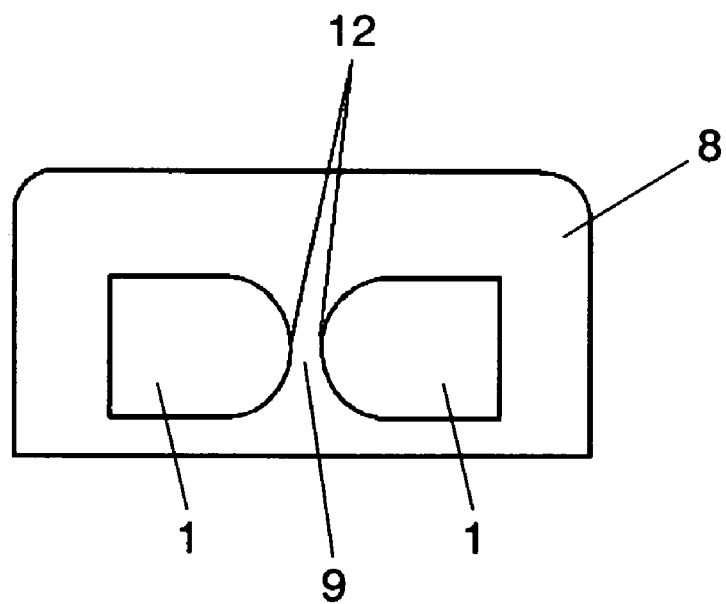
FIG. 8B is a cross-sectional view of an electronic component which is configured by the multilayer type capacitor shown in FIG. 8A.

A multilayer type capacitor 1 is one example of an element. The element may also be a non-multilayer type capacitor, a resistor, an inductor, and a filter. Chamfer 10 shown in FIGS. 6A, 6B and FIG. 9B, non-parallel part 11 shown in FIGS. 7A through 7C, and arc part 12 shown in FIGS. 8A and 8B are of a shape for forming a guiding part for surely filling armoring material 8 in opposed region 9 between multilayer type capacitors 1. The guiding part may be formed by a shape other than these shapes.

Figure 2:
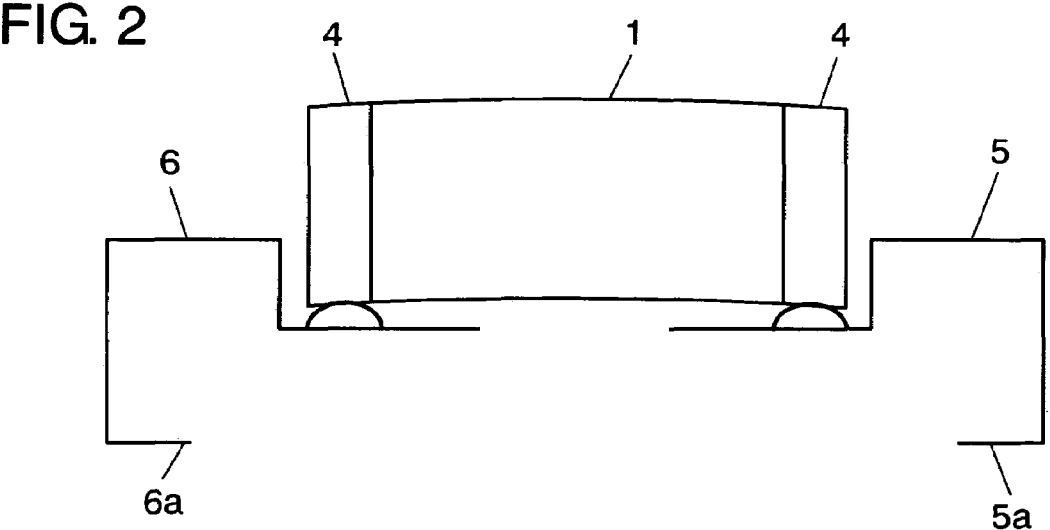
FIG. 2 is a connection configuration view of the multilayer type capacitor according to an exemplary embodiment of the present invention.
Figure 3:
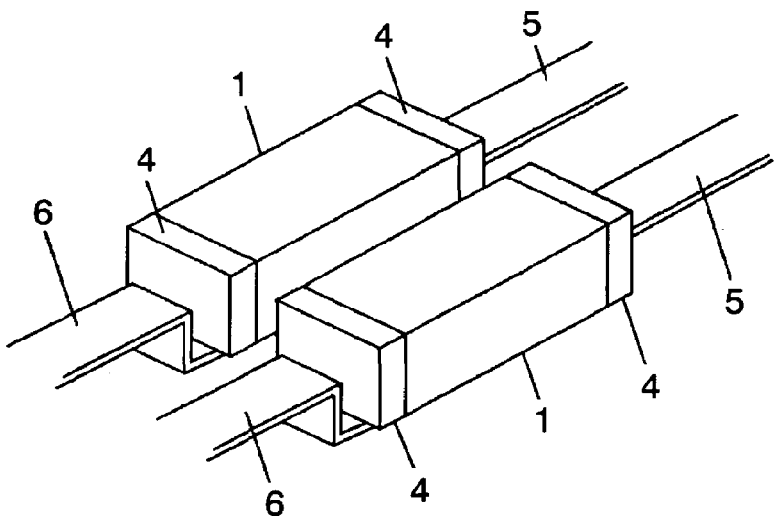
FIG. 3 is a perspective view in which the multilayer type capacitor according to an exemplary embodiment of the present invention is disposed.
Figure 4A:
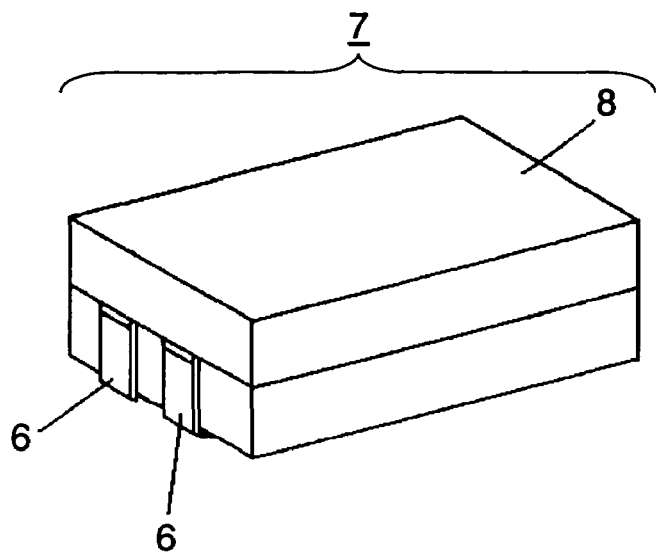
FIG. 4A is a perspective view of an electronic component according to an exemplary embodiment of the present invention.
Figure 4B:
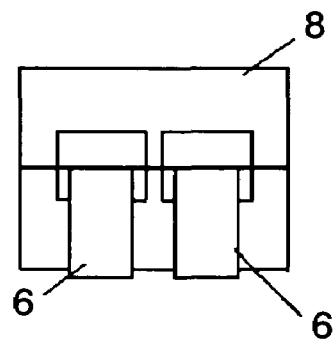
FIG. 4B is a front view of the electronic component shown in FIG. 4A.
Figure 4C:
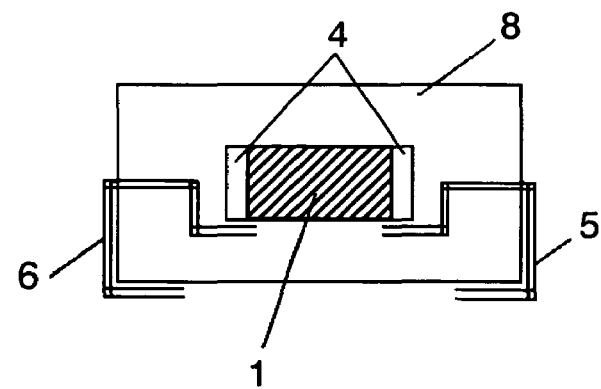
FIG. 4C is a cross-sectional view of the electronic component shown in FIG. 4A.

As shown in FIGS. 1 through 3 and FIGS. 4A and 4C, lead terminals 5, 6 are connected to terminal parts 4 of two multilayer type capacitors 1, respectively. Two multilayer type capacitors 1 and a part of lead terminals 5, 6 are molded with armoring material 8. Lead terminals 5, 6 are connected to wiring terminals of circuit substrates. By this, it becomes possible to mount electric component 7 with 4 terminals on the circuit substrate at once, and enables miniaturization. As shown in FIGS. 4A through 4C, two multilayer type capacitors 1 are molded with armoring material 8, and two sets of lead terminals 5, 6 are pulled out to an outside of the armoring material, and mounting to the circuit substrate becomes possible.

Due to this configuration, since two multilayer type capacitors 1 (i.e., two elements) are housed in one electronic component 7, it is possible to mount two multilayer type capacitors 1 on the circuit substrate at once. Since each of them is molded, endurance is high. It is possible to reduce a mounting area as compared to mounting them separately.

Hereinafter, detail of each part will be described.

Multilayer type capacitor 1 will be first described with reference to FIG. 1.

Dielectric base body 2 is a base body which was configured by a dielectric material, and for example, titanium oxide, barium titanate, etc. are preferably used. Alumina etc. may also be used. By using these materials, the multilayer type capacitor is properly formed with a necessary shape and size.

Inner electrode 3 is an electrode which is embedded in dielectric base body 2. As a constituent material of inner electrode 3, cited is a metal material which includes at least one of Ni, Ag, Pd, Cu, Au and so on. In particular, use of Ni or Ni alloy becomes advantageous in cost. It may also be an alloy of materials, and a material having a plating-processed surface. As a matter of course, it may be also an alloy etc. A thickness of inner electrode 3 is 1~5 μm. An interval between adjacent inner electrodes 3 is preferably 15 μm or more.

Inner electrode 3 is electrically connected to terminal parts 4. More specifically, inner electrode 3 which is connected only to one of terminal parts 4, and inner electrode 3 which is connected to the other of terminal parts 4 are opposed to each other. Capacitance is mainly generated between these opposed inner electrodes 3.

Terminal parts 4 are connected to inner electrode 3, and disposed to dielectric base body 2 in a pair. They are normally likely to be disposed at both ends of base body 2. Terminal parts 4 may also be disposed at places other than the both ends of bare body 2. For example, they may be formed on the top and bottom of dielectric base body 2, and these terminal parts 4 which are formed on the top and bottom, and lead terminals 5, 6 which will be described later, may be connected to each other. Terminal parts 4 may be formed by a material which contains at least one of Cu, Zn, Ni, Ag, Au and so on, and a plating process of a single layer or multiple layers maybe applied to its surface.

Terminal parts 4 may be configured by joining a metal cap to dielectric base body 2. Outermost parts (surface parts) of terminal parts 4 are preferably configured by a conductive material which has a melting point of 200° C. or more. By this configuration, even if high temperature is applied to an electronic component in a re-flow process etc., thermal damage does not occur at terminal parts 4.

As one example of a manufacturing method of multilayer type capacitor 1, a plurality of dielectric sheets where inner electrode 3 is applied to one surface are prepared, and these dielectric sheets are laminated in such a manner that electrodes are not directly contacted, and terminal parts 4 are formed at both ends of this laminated body.

At this time, a dimension of multilayer type capacitor 1 is, assuming that its length is L1, a width is L2, and a height is L3, configured so as to fall within the range of 2.0 mm≦L1≦5.7 mm
0.8 mm≦L2≦5.0 mm
1.0 mm≦L3≦1.5 mm.

When L1 through L3 are made smaller than the above-described lower limits, a forming area of inner electrode 3 becomes insufficient, and a distance between inner electrodes 3 becomes narrow, and the number of inner electrodes 3 has to be reduced. Thus, it becomes difficult to obtain a large capacitance value, and it becomes difficult to obtain electronic component 7 which has a wide range of capacitance.

A dimension of the armoring material is, assuming that a length is P1, a height is P2, and a width is P3, configured so as to fall within the range of 3.2 mm≦P1≦7.1 mm
2.5 mm≦P2≦6.3 mm
1.5 mm≦P3≦2.4 mm.

By making an element (multilayer type capacitor 1) of a size which falls within the above-described range or an electronic component with an armoring material which falls within the above-described range, it is possible to realize miniaturization of electronic devices, and electronic components which are able to narrow a distance between conductive lines.

Figure 15:
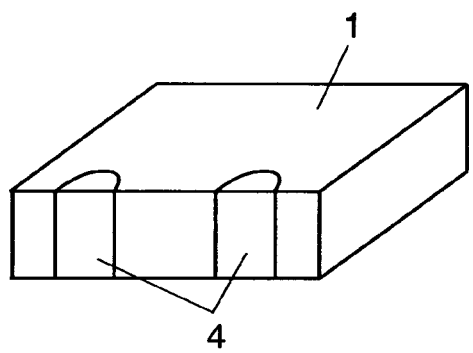
FIG. 15 is a perspective view of a multilayer type capacitor according to an exemplary embodiment of the present invention.
Figure 16:
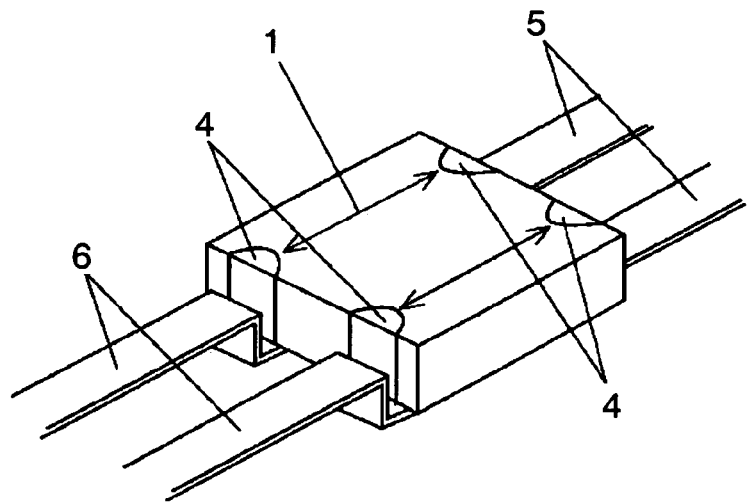
FIG. 16 is a perspective view of a multilayer type capacitor according to an exemplary embodiment of the present invention.

FIGS. 1 through 3 etc. represent multilayer type capacitor 1 in which a pair of terminal parts 4 are formed on one base body, and FIGS. 15, 16 show multilayer type capacitor 1 in which a plurality of pairs of terminal parts 4 are formed on one base body.

For example, when disposing a plurality pairs of terminal parts 4 on an end surface of the base body which is formed of a ceramic etc., such as alumina, it is also preferable to form a plurality of electric elements such as capacitors and multilayer type capacitors 1, although they are viewed as a single element body.

For example, if the element is multilayer type capacitor 1, inner electrode 3 in the base body is divided with respect to each terminal part 4 being in pairs, and terminal parts 4 are connected to them, respectively. As a result, it is possible to form a plurality of parallel multilayer type capacitors 1 as a single element body. In a case of other electric elements such as single plate capacitors, resistors, and inductors, a plurality of these elements are housed in one base body so as to be aligned in parallel, and each of them is connected to terminal part 4, and thereby, it is possible to configure a plurality of electric elements as a single element body.

By the use of an element such as multilayer type capacitor 1 which is composed of a single element body, it is possible to easily manufacture elements, and as a result, it is easy to manufacture electronic component 7, and miniaturization is therefore further facilitated.

In FIGS. 15, 16, terminal part 4 is configured as two pairs, but there may be three pairs or more, and it may be properly determined in tune with a specification.

A single piece of an element as shown in FIGS. 15, 16 may be encapsulated in armoring member 8, and a plurality of elements may be encapsulated. In a case of encapsulating a plurality of elements, as described later, it is preferable to dispose a guiding part for armoring member 8 on opposed surfaces of the elements. For example, R is formed on a corner part of the opposed surface of the element, and a shape of a cross section of the element is made in a shape of trapezoid, and in a shape of arc, and so on. By this, as described later, even in a case of encapsulating a plurality of elements, it is possible to eliminate electric leakage and electric field coupling occurs between the opposed surfaces, and so on, and a withstand voltage of electric component 7 is secured.

Lead terminals 5, 6 will now be then described.

Lead terminals 5, 6 are, as apparent from FIGS. 2, 3, connected to terminal parts 4 of multilayer type capacitor 1, and in such a state that pull-out to an outside is possible. By this configuration, even if lead terminals 5, 6, are molded in armoring material 8 which will be described later, it is possible to pull out lead terminals 5, 6 which can be electrically connected to an outside of the armoring material 8. Accordingly, it becomes possible to electrically connect internally molded multilayer type capacitor 1 to wiring of the circuit substrate.

As a major constituent material of lead terminals 5, 6, a metal material, which is selected from at least one of Fe, Cu, and Ni, is preferably selected. Use of these materials is advantageous in an aspect of an electric characteristic and workability. An alloy of these metals may also be used, and a plating process of a single layer or multiple layers may be applied to its surface.

Lead terminals 5, 6 have joint parts which are jointed to terminal parts 4, elongated parts which are elongated toward an outside of armoring material 8, and mounting parts 5a, 6a which are further folded back to be connected to wirings of the circuit substrate. As shown in FIG. 4C, mounting parts 5a, 6a may be folded back in such a direction that they face each other, and may also be made as a so-called gulf wing type in which they are folded back in different directions with respect to each other. It is desirable that the joint parts with joint terminal parts 4 and lead terminals 5, 6 are configured by a joint material in which a melting point is 200° C. or more, and in this case, it is possible to avoid occurrence of characteristic deterioration due to heat which is received in a re-flow process etc., in mounting electric component 7.

In a case that terminal parts 4 are disposed on and beneath dielectric base body 2, but not at both of its sides, and in tune with this, lead terminals 5, 6 may be pulled out to an outside of armoring material 8, in such a mode that they are connected above and below, alternately.

By pulling out lead terminals 5, 6 from surfaces of armoring material 8, which are opposed to each other, respectively, it is possible to widen a distance between lead terminals 5 and 6, and therefore, balance after mounting becomes better.

As shown in FIG. 3, in this embodiment, in order to mold two multilayer type capacitors 1 into one, lead terminals 5, 6 are individually connected to respective multilayer type capacitors 1. In FIG. 3, lead terminals 5, 6 are connected to two multilayer type capacitors 1, but it may be configured by three or more multilayer type capacitors 1.

It is preferable that parasitic capacitance, which occurs between lead terminals 5, 6, is set in the range of 0.1 pF through 5.0 pF. When parasitic capacitance is larger than 5.0 pF, capacitance fluctuation becomes very large on the occasion when an electronic component is configured. To make parasitic capacitance smaller than 0.1 pF result in difficulty in manufacturing. It is also possible to trim away lead terminals 5, 6 according to need, and to make an ex-post adjustment of its parasitic capacitance.

By making lead terminals 5, 6 in an approximately identical shape, it is possible to reduce the number of components, so that productivity is improved, and to pull out lead terminals 5, 6 from approximately the same height in armoring material 8, and to pull out portions which are of approximately the same length, so that it is possible to manufacture electronic components with good symmetry.

Armoring material 8 will now be described.

Armoring material 8 is, as indicated in FIGS. 4A through 4C, of such a structure that two multilayer type capacitors 1 are molded together. Multilayer type capacitors 1 and a part of lead terminals 5, 6 are molded. Electronic component 7 is finalized by being molded with armoring material 8. An outer shape of electronic component 7 is a shape which is close to a cuboid, and it is preferable to improve its durability by applying a chamfer to each side and corner part. By drawing out lead terminals 5, 6, it becomes possible to mount electronic component 7 on the circuit substrate.

As armoring material 8, epoxy resin such as a opt-cresol-novolac series, a biphenyl series, and pentadiene series is preferably used.

By setting a minimum value of a distance between a surface of armoring material 8 and a surface of multilayer type capacitor 1 (in other words, the thinnest wall thickness of armoring material 8) to 0.1 mm or more, it is possible to improve an outer skin withstand voltage.

By projecting portions, where lead terminals 5, 6 of armoring material 8 are pulled out, more than other portions, it is possible to strengthen roots of pull-out portions of lead terminals 5, 6. By this, it becomes easy to prevent bending etc. of lead terminals 5, 6, and interfusion of moisture from an outside.

One example of a manufacturing method of electronic component 7 will be described here.

Two element bodies, in each of which lead terminals 5, 6 are connected to two multilayer type capacitors 1, are aligned, and multilayer type capacitors 1 and a part of lead terminals 5, 6 are covered by use of a molding machine. Then, portions of lead terminals 5, 6, which are pulled out from armoring material 8, are folded back as shown in FIG. 4C, and the electronic component is completed.

Figure 5A:
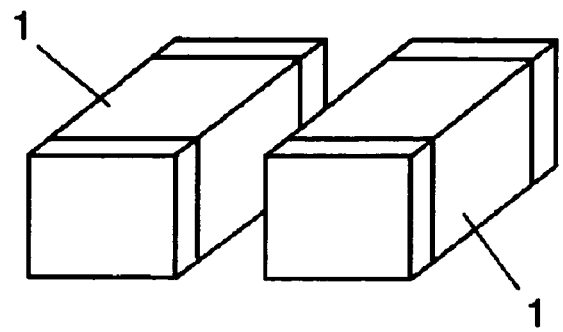
FIG. 5A is a cross-sectional view which shows an arrangement and a shape of a multilayer type capacitor in a comparative example.
Figure 5B:
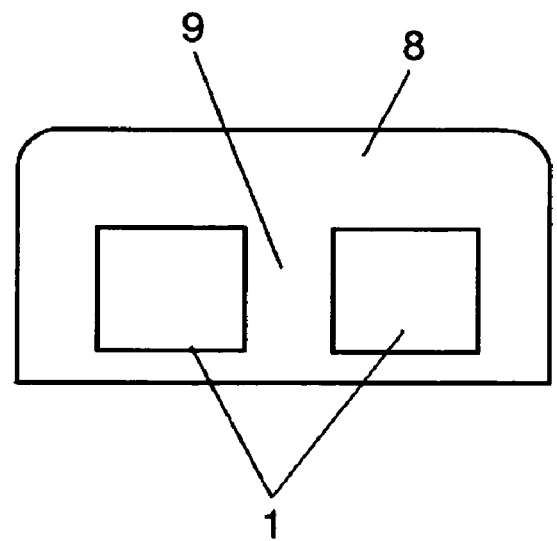
FIG. 5B is a cross-sectional view of an electronic component which is configured by the multilayer type capacitor shown in FIG. 5A.

FIGS. 5A, 5B represent such a state that two multilayer type capacitors 1, each having a shape of approximately a cuboid, have been molded, as comparative examples.

As shown in FIGS. 5A, 5B, each capacitor 1 is of a cuboid shape. In a case that corner parts of an opposed surface where two multilayer type capacitors 1 face to each other are angulate, there is such a problem that armoring material 8 is not sufficiently filled in opposed region 9. On the occasion when resin, which configures the armoring material 8, enters into the opposed region 9, the corner parts become barriers so that it can not enter sufficiently. There also occurs such a case that density in the vicinity of the corner part is lowered and many pinholes are generated, and so on. By these problems, insufficiency etc. of a withstand voltage between multilayer type capacitors 1 is caused. As a matter of course, insulating resistance between multilayer type capacitors 1 also becomes insufficient, current leakage etc. due to electric field coupling is generated, and it becomes a cause of noise generation etc. FIGS. 6 through 9 represent a configuration in this invention which solves these problems.

Figure 6A:
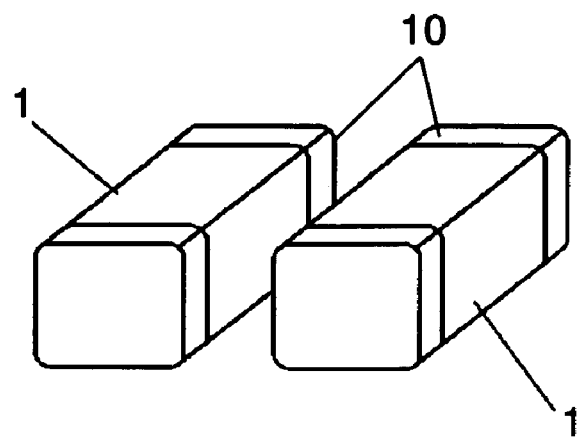
FIG. 6A is a perspective view which shows an arrangement and a shape of a multilayer type capacitor according to an exemplary embodiment of the present invention.
Figure 6B:
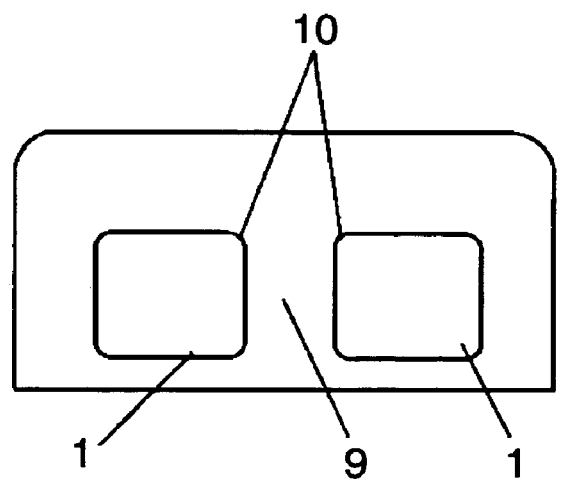
FIG. 6B is a cross-sectional view of an electronic component which is configured by the multilayer type capacitor shown in FIG. 6A.

Capacitor 1 shown in FIGS. 6A, 6B is of a shape having chamfer 10. Capacitor 1 shown in FIGS. 7A through 7C is of a shape having non-parallel part 11. Capacitor 1 shown in FIGS. 8A, 8B is of a shape having arc part 12. By setting a shape of capacitor 1 in this manner, it becomes easy to fill armoring material 8 in opposed region 9. In FIG. 9, opposed surface distance 13 is 0.1 mm or more. As to this opposed surface distance 13, its minimum distance becomes is 0.1 mm or more, in a case that surfaces, which face each other, are not in parallel.

FIGS. 6A and 6B, in which chamfer 10 is used as the guiding part will now be described.

Multilayer type capacitor 1 represented in FIGS. 6A, 6B has chamfers 10 at corner parts thereof. Chamfers 10 are disposed at all corner parts which appear on an outer shape in FIGS. 6A, 6B, but they may be disposed only on opposed surfaces, and not disposed at all on corner parts. In the opposed surfaces, for example, in a case that armoring material 8 is filled in opposed region 9, if it is filled only from above, chamfers 10 may be formed only at upper corner parts. If it is filled from below, chamfers 10 may be formed only at lower corner parts. However, in order to make the filling amount of armoring material sufficient, it is preferable to form chamfers 10 at all corner parts of the opposed surface.

Because of the existence of chamfer 10, it becomes easy to fill armoring material 8 in opposed region 9. The barrier due to the corner part is reduced, and it becomes easy for resin, which configures armoring material 8, to enter into opposed region 9. On the opposed surface of multilayer type capacitor 1 in the vicinity of the corner parts, the armoring material is floated from the opposed surface, and it is possible to suppress occurrence of pinholes due to insufficient filling of armoring material 8.

Chamfer 10 preferably has its curvature radius of 0.05 mm or more. When a curvature radius of chamfer 10 is smaller than 0.05 mm, a curb of a corner part which is made by chamfer 10 takes the form of an acute angle, and it becomes insufficient as the guiding part for filling armoring material 8 in opposed region 9.

FIGS. 7A through 7C, in which non-parallel part 11 is used as the guiding part will now be described.

Non-parallel part 11 is defined in such a manner that opposed surfaces of multilayer type capacitor 1 are not parallel to each other. As represented in FIGS. 7A, 7B, a shape of cross section of multilayer type capacitor 1 becomes trapezoid, and by this, opposed surfaces become non-parallel to each other. As shown in FIGS. 7A, 7B, an interval of an upper portion of opposed region 9 is broadened. Due to this configuration, barriers of the corner parts become harmless, and armoring material 8 is sufficiently filled in opposed region 9. In particular, as shown in FIGS. 7A through 7B, non-parallel part 11 is of such a shape that a distance of opposed surfaces is broadened from a lower side toward a upper side, and therefore, it is particularly effective if armoring 8 is filled in opposed region 9 from an upper side of multilayer type capacitor 1. On the contrary, in a case of filling it from a lower side, it is fine if non-parallel part 11 is formed in such a manner that an opposed surface distance on a lower side is broadened.

As shown in FIG. 7C, there is no necessity that non-parallel part 11 is non-parallel across an entire opposed surface, and only a portion may be non-parallel. As shown in FIG. 7C, non-parallel parts 11 exist only on a upper side of the opposed surface, and lower sides may become in parallel. In this case also, eliminated is a barrier due to the corner part on a upper opposed surface, and therefore, armoring material 8 is sufficiently filled in opposed region 9.

Even if a shape of cross section of multilayer type capacitor 1 is not trapezoid, non-parallel parts 11 are to be formed on the opposed surfaces, if a non-orthogonal portion exists on at least one of the corner parts in a shape of cross section of multilayer type capacitor 1. At this time, it is fine if non-parallel parts 11 exist only on the opposed surface. Chamfer 10 may be further combined with the corner part which is formed at non-parallel part 11, which has a further advantage.

FIGS. 8A and 8B, in which arc part 12 is used as the guiding part will now be described.

Arc parts 12 are opposed surfaces of two multilayer type capacitors 1 which are of arc shapes. Two multilayer type capacitors 1 face each other by arc parts 12, and thereby, in opposed region 9, reduced are barriers due to corner parts in a upper side and a lower side which become entrances of armoring material 8. By a smooth curved line of arc part 12, armoring material 8 enters into opposed region 9 slowly, and a sufficient amount of armoring material 8 is filled. Since there is no hang-up etc. of armoring material 8 due to the corner parts, a thin density region etc. is difficult to be formed, and since it is also possible to sufficiently reduce occurrence of pinholes, a withstand voltage between multilayer type capacitors 1 is heightened, and electric field leakage etc. is suppressed. Arc part 12 may be disposed on a non-opposed surface as well as the opposed surface. By this, the durability of multilayer type capacitor 1 is heightened. Arc part 12 may be disposed across the entirety of the opposed surface, or may be disposed only on a portion thereof. In this case, it is possible to avoid insufficient filling due to existence of the corner part at an entrance position of armoring material 8 such as an upper side and a lower side of opposed region 9, in the same manner as non-parallel part 11.

Figure 9A:
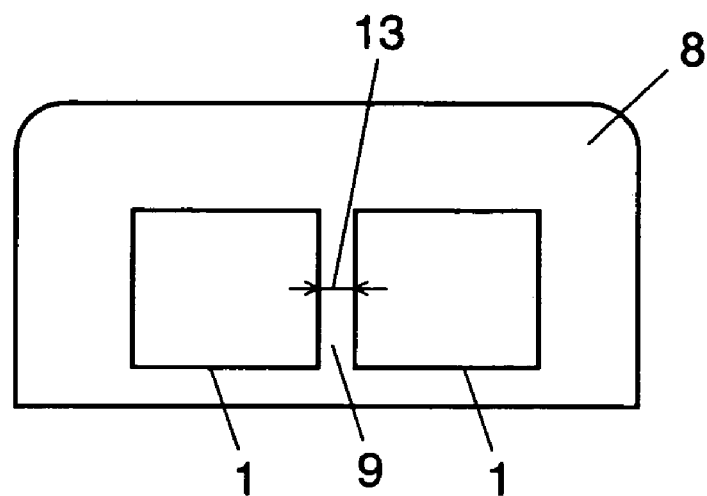
FIG. 9A is a cross-sectional view of an electronic component according to an exemplary embodiment of the present invention.
Figure 9B:
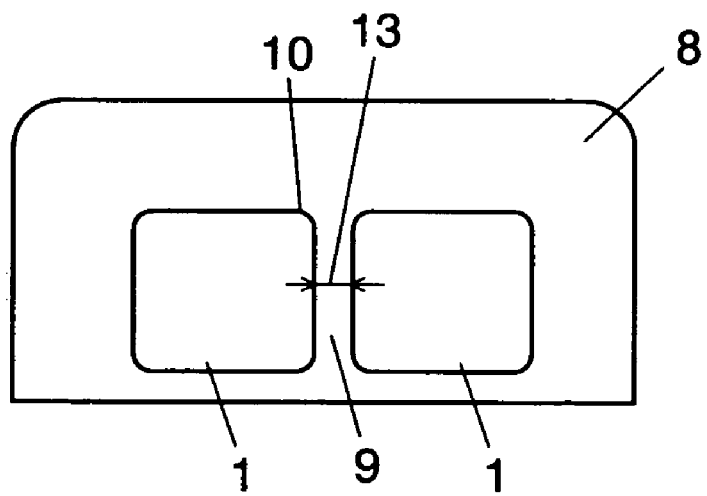
FIG. 9B is a cross-sectional view of the electronic component according to an exemplary embodiment of the present invention.

With reference to FIGS. 9A and 9B, opposed distance 13 will be described.

Opposed distance 13 of two multilayer type capacitors 1 is a distance between opposed surfaces. In a case that opposed distance 13 is very small, there is such a problem that a filling amount of armoring material 8 becomes insufficient in opposed region 9, but if it is set to 0.1 mm or more, problems such as a withstand voltage are resolved.

As shown in FIG. 9A, the opposed distance 13, in a case that multilayer type capacitors with cuboid shape having corner parts are disposed, may be set to 0.1 mm or more, and as described in FIG. 9B, opposed distance 13 may be also set to 0.1 mm or more after the guiding part such as chamfer 10 is formed.

By defining opposed distance 13 as 0.1 mm or more, in this manner, a filling amount of armoring material 8 in opposed region 9 becomes sufficient, and improvement of a withstand voltage and prevention of electric field leakage are realized.

As above, even in such a case that, on the opposed surface between multilayer type capacitors 1, the guiding part such as chamfer 10, non-parallel part 11, and arc part 12 is formed, and its opposed distance 13 is defined, and elements starting with two multilayer type capacitors 1 are disposed and molded with one armoring material 8, and a small size electronic component is made, it is possible to suppress performance fluctuation, such as improvement of withstand voltage and prevention of electric field leakage, and to improve endurance, without disturbing miniaturization.

It has so far been explained a case in which two multilayer type capacitors 1 are disposed, but they may be three or more, and in this case, by taking the same configuration in respective opposed regions 9, reduction of performance fluctuation, improvement of endurance, facilitation of miniaturization can be realized.

Much the same is true on any one of other electric elements such as a resistor and a normal capacitor, an inductor, and a filer, other than multilayer type capacitor 1.

With regard to such matters that it is very effective that chamfer 10 is formed, and a curvature radius of this chamfer 10 is 0.05 mm or more, and it is very effective that opposed distance 13 is set to 0.1 mm or more, it will be described on the basis of an experimental result.

Figure 10A:
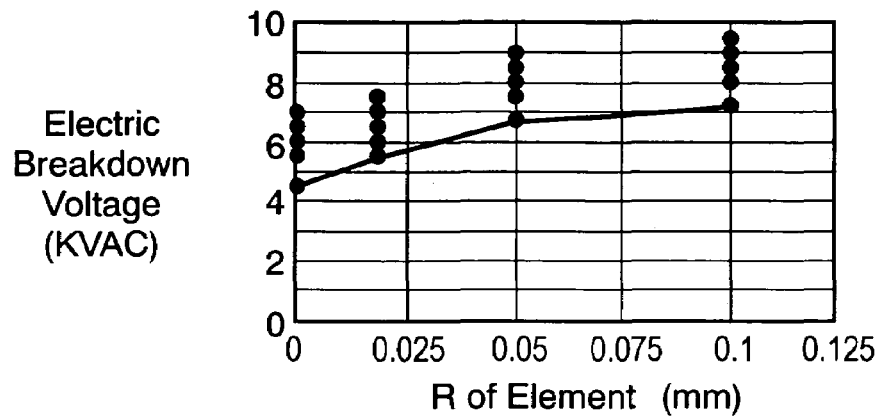
FIG. 10A is a graph which shows data of an experimental result of a breakdown voltage between elements of an electronic component according to an exemplary embodiment of the present invention.

FIG. 10A shows a result of such an experiment that a relation of a curvature radius (R) of chamfer 10 and a breakdown voltage between elements was compared, as a graph.

A horizontal axis of FIG. 10A is a value of curvature radius (R) of chamfer 10, and a vertical axis is a voltage value at which there occurs breakdown between multilayer type capacitors 1. As apparent from FIG. 10A, in the case that the curvature radius of chamfer 10 is less than 0.05 mm, a voltage value, at which it can be broken down, is approximately 4 KVAC, which is not sufficient. In a case that it is used for a modem, a power supply circuit and so on, which require a high withstand voltage, 4 to 5 KVAC or more becomes necessary. As is apparent from FIG. 10A, in case of 0.05 mm or more, 6 KVAC or more is obtained, and in a case of more than that, it is saturated to an approximately constant level. If chamfer 10 is disposed as the guiding part, and a curvature radius of this chamfer 10 is set to 0.05 mm or more, it is found that a voltage value, at which it can be broken down, is converged to a constant level. Judging from this, if curvature radius of chamfer 10 is set to 0.05 mm or more, sufficient armoring material 8 is filled in the opposed region, and it is clear that sufficient readiness for breakdown is provided.

Figure 10B:
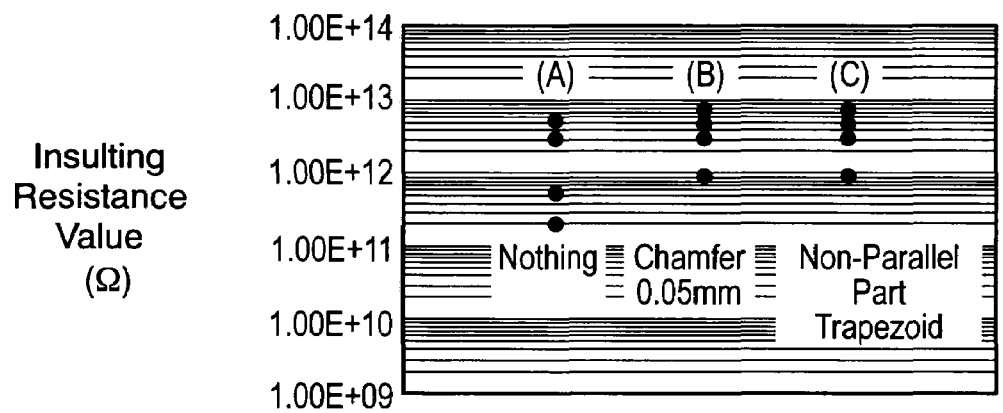
FIG. 10B is a graph which shows data of an experimental result of moisture resistance of the electronic component according to an exemplary embodiment of the present invention.

In FIG. 10B, insulating resistance values after a moisture resistance loading test are plotted. The moisture resistance loading test is of such a thing that certain moisture is applied to an electronic component for a certain period of time or more, and thereafter, insulating resistance between multilayer type capacitors 1 is measured. As the insulating resistance is higher, as a matter of course, there is no electric field leakage between multilayer type capacitors 1, and noises etc. are not generated.

In FIG. 10B, (A) shows a result of an electronic component in a case that no processing is carried out, and (B) shows a result when chamfer 10 is formed, and its curvature radius is set to 0.05 mm, and (C) shows a result when non-parallel part 11 is disposed, and a shape of cross section of multilayer type capacitor 1 is trapezoid. As is apparent from the results, in the case of (B), (C), insulating resistance values are of order of 12 power to 10 through order of 13 power, and it is found that sufficient insulating resistance is maintained. By this, it is understood that moisture resistance is sufficiently high, and insulating resistance between multilayer type capacitors 1 is sufficiently maintained, even if it is placed under moisture for many hours. By this, even in a case of prolonged use in a bad environment, there is no lowering of insulating resistance, and eliminated is such a case that signal leakage etc. generated between multilayer type capacitors 1, and noises and cross talk etc. are not generated.

Figure 10C:
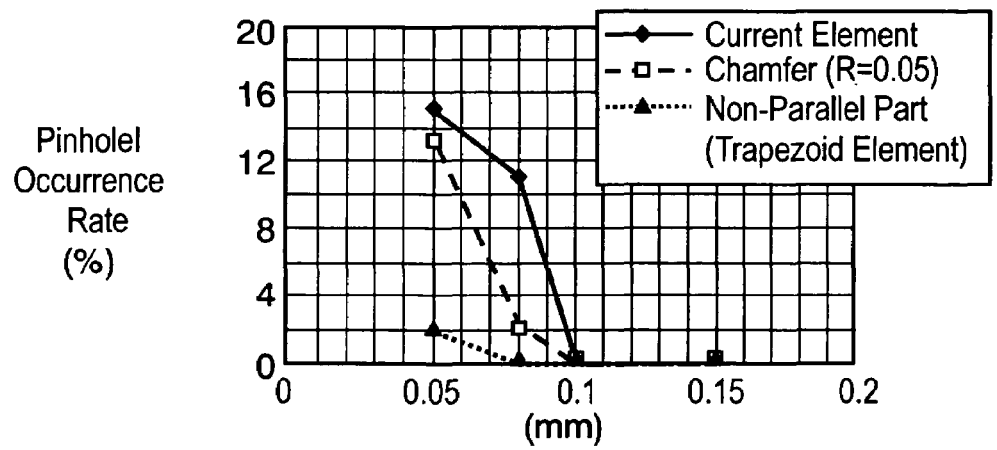
FIG. 10C is a graph which shows data of an experimental result of a pinhole occurrence rate according to an exemplary embodiment of the present invention.

FIG. 10C represents a measurement result of a pinhole occurrence rate of armoring material 8, which exists in opposed region 9 between multilayer type capacitors 1, was converted into a graph.

A horizontal axis indicates the opposed distance of multilayer type capacitors 1, and a vertical axis indicates an occurrence rate of pinholes. As is apparent from the graph, even if the guiding part such as chamfer 10 and non-parallel part 11 is not disposed, if opposed distance 13 is 0.1 mm or more, the occurrence rate of pinholes becomes nearly 0%, and sufficient performance is to be provided. In the same manner, even in a case that the guiding part is formed, if opposed distance 13 is 0.1 mm or more, the occurrence rate of pinholes is to be suppressed to nearly 0%. In the case that non-parallel part 11 and chamfer 10 are disposed, it is found that, even if opposed distance 13 is less than 0.1 mm, the pinhole occurrence rate is suppressed to a lower value.

By setting the opposed distance to 0.1 mm, and further disposing chamfer 10 and non-parallel part 11, occurrence of pinholes is suppressed, and endurance to a breakdown voltage and moisture resistance performance are further improved. Definition of the opposed distance and formation of the guiding part such as the chamfer may be provided individually, and they may be used in combination. The combination provides a further advantage.

Finally, with reference to FIG. 11, realization of miniaturization will be described.

Figure 11A:
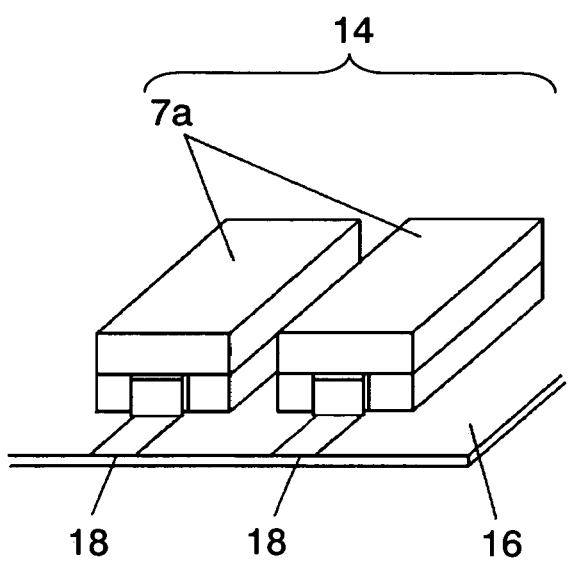
FIG. 11A is a view which shows a mounted state of an electronic component in a conventional technology.
Figure 11B:
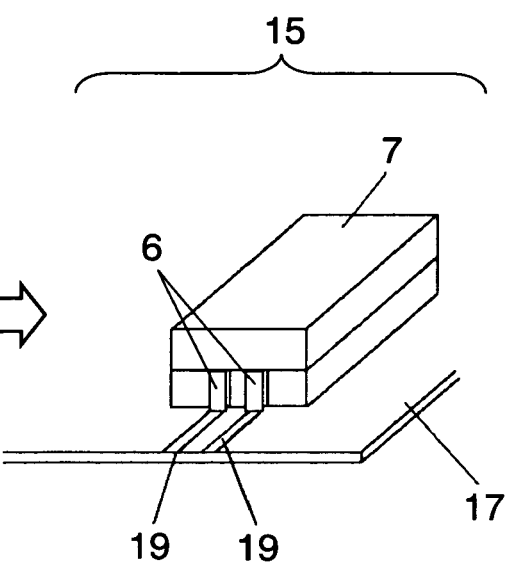
FIG. 11B is a view which shows a mounted state of an electronic component according to an exemplary embodiment of the present invention.

FIG. 11A represents such a case that two electronic components, in which one element is molded, are mounted, as a comparative example, and FIG. 11B represents such a case that one electronic component 7, in which two elements are molded, was mounted, in this invention. Like a modem and a power line communication module, an electronic component, in which multilayer type capacitors or capacitors are molded in respective lines of a two-wire system, of output data and input data, for the purpose of noise cut etc., is mounted.

As is apparent from FIG. 11A, in electronic component 7a in which a single element is molded as in heretofore, two processing procedures for mounting are necessary, and further, since dimensions of respective electronic components 7a are large, a necessary mounting area is enlarged. It is necessary to make a distance between wirings 18 wide, in tune with a distance between respective adjacent lead terminals of two electronic components 7a, and as a matter of course, it becomes necessary to make the mounting area larger in size, and to draw out wirings longer.

In contrast to this, as apparent from FIG. 1B, in a case of electronic component 7 in which two elements are molded, the mounting area is small. Since a distance between adjacent lead terminals 5, and terminals 6 is also narrowed, it is also possible to narrow a distance between wirings 19, and as a matter of course, miniaturization of the mounting area is further facilitated. Drawing out of wirings becomes unnecessary. On this account, it is possible to avoid wiring radiation which is generated by drawing out of wirings, and bad influence to other mounted components. As a matter of course, it is possible to mount the electronic component 7 on a circuit substrate by one processing procedure at the time of mounting, and it is possible to reduce mounting cost.

Figure 12:
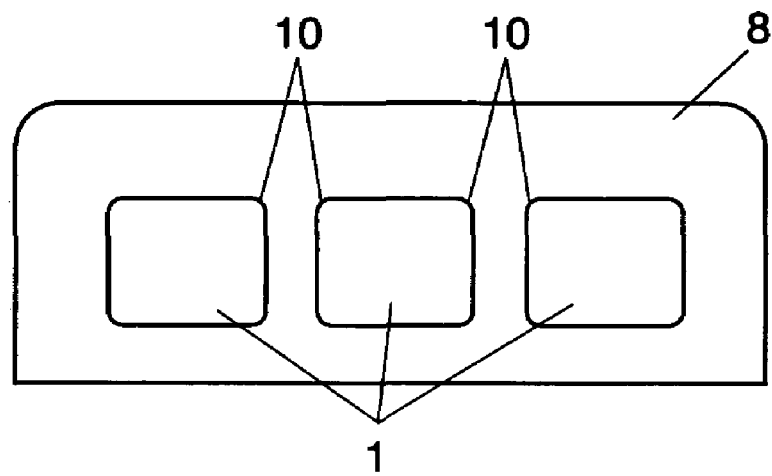
FIG. 12 is a cross-sectional view of an electronic component according to an exemplary embodiment of the present invention.

The same advantages are produced even in a case that three or more elements are molded in one electronic component 7. FIG. 12 shows such a case that three multilayer type capacitors 1 are molded. In this case, chamfers 10 are formed on respective opposed surfaces of three multilayer type capacitors 1. As a matter of course, the chamfers may be or may not be disposed on another place than the opposed surface.

In a case of molding a plurality of multilayer type capapcitors 1, capacitance values of respective multilayer type capacitors 1 may be changed. It is preferable to select a necessary capacitance value for each individually, in tune with a characteristic of a device for mounting, and to mold in one armoring material 8. As a matter of course, it is fine that different kinds of elements are molded in such a manner that, among a plurality of elements, a certain element may be multilayer type capacitor 1, and others are normal capacitors.

Figure 13:
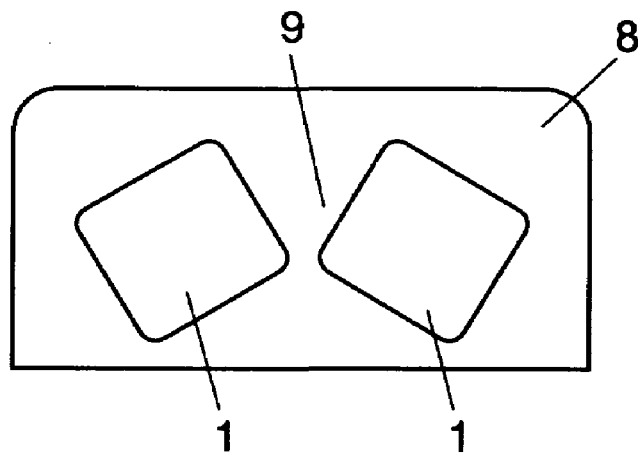
FIG. 13 is a cross-sectional view of an electronic component in a mode for carrying out this invention.
Figure 14:
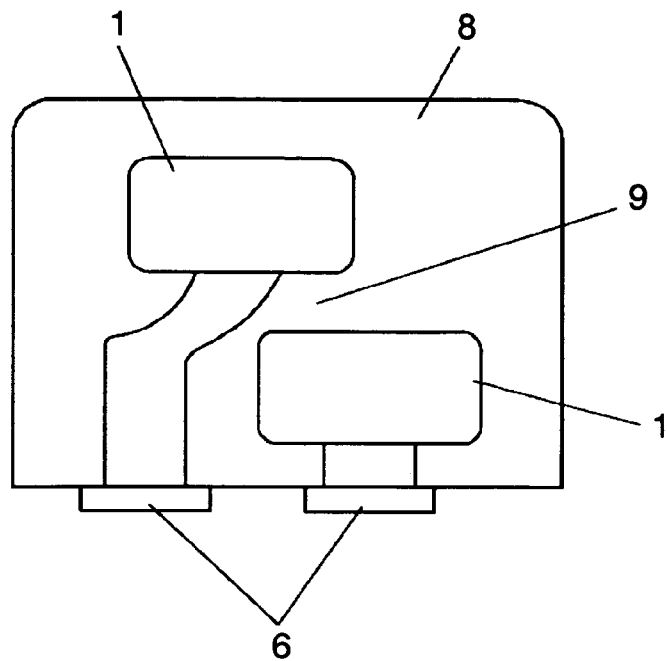
FIG. 14 is a cross-sectional view of an electronic component according to an exemplary embodiment of the present invention.

As shown in FIG. 13, it is preferable to have armoring material 8 filled sufficiently in the opposed region 9, by molding respective elements in a tilted manner to form an inverted V shape. It is also preferable to lower a height of an element which is molded therein, in order to lessen the height of molded electronic component 7, or to increase the height of an element and narrow a width direction, in order to lessen a width in a lateral direction of electronic component 7. As shown in FIG. 14, it is preferable to form electronic component 7 which is in conformity with a specification of a device, by piling up elements alternately to lessen a width direction and a height direction. At this time, the guiding part such as chamfer 10, non-parallel part 11, and arc part 12 may be disposed in respective elements such as multilayer type capacitors 1, and if armoring material 8 is filled sufficiently in opposed region 9, the guiding part may not be disposed.

As above, a plurality of elements such as multilayer type capacitor 1 are molded with one armoring material to form one electronic component 7, and thereby, it is possible to realize miniaturization of an electronic component. Since one electronic component 7 is mounted on a circuit substrate by one processing, it is possible to save labor, and to reduce mounting cost. As a matter of course, it contributes to a reduction of a mounting area. In a case that a plurality of elements are laid out and molded in this manner, by defining an opposed distance between elements, or by disposing a guiding part such as a chamfer 10, non-parallel part 11, and arc part 12, which makes it easy to fill an armoring material in an opposed region, filling in the opposed region becomes sufficient, and endurance such as a withstand voltage between elements and a moisture resistance property is improved, and performance fluctuation of electronic component 7 is reduced.

It is also preferable to form a composite component, by having an inductor, a capacitor and so on mixed in one armoring material 8 and molding them. The above-described configurations and advantages are particularly useful in a high withstand voltage electronic component in which a high withstand voltage is required.

This invention is an electronic component which has a plurality of elements, a pair of terminal parts which are disposed on the element, and an armoring material which covers the elements and a part of the terminal parts, wherein it is possible to mount a plurality of electronic components all at once, by such a configuration that the plurality of elements are disposed in the armoring material at predetermined intervals and guiding parts for guiding the armoring material toward an opposed region of the elements are disposed on opposed surfaces between the elements, and by such a configuration that a plurality of elements, in particular, multilayer type capacitors are molded in one armoring material and terminals are pulled to an outside of the electronic component. Accordingly, this invention is applicable to an application which requires a reduction of mounting procedures, and a reduction of mounting cost.

What is claimed is:

1. An electronic component comprising:
   a first element having a first plurality of terminal parts;
   a second element having a second plurality of terminal parts; and
   an armoring material which covers said first element, said second element, at least a part of said first plurality of terminal parts, and at least a part of said second plurality of terminal parts,
   wherein said first element is disposed adjacent to said second element with a gap separating said first element from said second element, and
   wherein at least one of said first element and said second element comprises a guiding part adjacent to said gap which is disposed so as to guide said armoring material toward said gap.

2. The electronic component according to claim 1,
   wherein a length P1 of said armoring material is within a range of 3.2 mm≦P1≦7.1 mm,
   wherein a width P2 of said armoring material is within a range of 2.5 mm≦P1≦6.3 mm, and
   wherein a height P3 of said armoring material is within a range of 1.5 mm≦P3≦2.4 mm.

3. The electronic component according to claim 2,
   wherein a length L1 of each of said first and second elements is within a range of 2.0 mm≦L1≦5.7 mm,
   wherein a width L2 of each of said first and second elements is within a range of 0.8 mm≦L2≦5.0 mm, and
   wherein a height L3 of each of said first and second elements is within a range of 1.0 mm≦L3≦1.5 mm.

4. The electronic component according to claim 1, wherein each of said first and second elements comprises a single base body.

5. The electronic component according to claim 4, wherein said first and said elements are encapsulated by said armoring material.

6. The electronic component according to claim 1, wherein said gap between said first element and said second element is 0.1 mm or more.

7. The electronic component according to claim 1, wherein said guiding part comprises a chamfer which is formed at a corner part of at least one of said first and second elements.

8. The electronic component according to claim 7, wherein said chamfer has a curvature radius of 0.05 mm or more.

9. The electronic component according to claim 1, wherein said guiding part comprises a first surface of said first element, said first surface of said first element being disposed so as not to be parallel to an opposed surface of said second element.

10. The electronic component according to claim 1, wherein said guiding part comprises an arc part of at least one of said first and second elements.

11. The electronic component according to claim 1, wherein each of said first and second elements comprises a guiding part adjacent to said gap.

12. An electronic component comprising:
    a first multilayer type capacitor which includes a first dielectric base body having a first inner electrode embedded therein, and a first plurality of terminal parts disposed on said first dielectric base body;
    a second multilayer type capacitor which includes a second dielectric base body having a second inner electrode embedded therein, and a second plurality of terminal parts disposed on said second dielectric base body;
    a first plurality of lead terminals which are connected to said first plurality of terminal parts;
    a second plurality of lead terminals which are connected to said second plurality of terminal parts; and
    an armoring material which covers said first multilayer type capacitor, said second multilayer type capacitor, a part of said first plurality of lead terminals, and a part of said second plurality of lead terminals,
    wherein said first multilayer type capacitor is disposed adjacent to said second multilayer type capacitor with a gap separating said first multilayer type capacitor from said second multilayer type capacitor, and
    wherein at least one of said first multilayer type capacitor and said second multilayer type capacitor comprises a guiding part adjacent to said gap which is disposed so as to guide said armoring material toward said gap.

13. The electronic component according to claim 12,
    wherein a length P1 of said armoring material is within a range of 3.2 mm≦P1≦7.1 mm,
    wherein a width P2 of said armoring material is within a range of 2.5 mm≦P1≦6.3 mm, and
    wherein a height P3 of said armoring material is within a range of 1.5 mm≦P3≦2.4 mm.

14. The electronic component according to claim 12, wherein said gap between said first multilayer type capacitor and said second multilayer type capacitor is 0.1 mm or more.

15. The electronic component according to claim 12,
    wherein a length L1 of each of said first and second multilayer type capacitors is within a range of 2.0 mm≦L1≦5.7 mm,
    wherein a width L2 of each of said first and second multilayer type capacitors is within a range of 0.8 mm≦L2≦5.0 mm, and
    wherein a height L3 of each of said first and second multilayer type capacitors is within a range of 1.0 mm≦L3≦1.5 mm.

16. The electronic component according to claim 12, wherein each of said first and second multilayer type capacitors comprises a single base body.

17. The electronic component according to claim 16, wherein said first and second multilayer type capacitors are encapsulated by said armoring material.

18. The electronic component according to claim 12, wherein said guiding part comprises a chamfer which is formed at a corner part of at least one of said first and second multilayer type capacitors.

19. The electronic component according to claim 18, wherein said chamfer has a curvature radius of 0.05 mm or more.

20. The electronic component according to claim 12, wherein said guiding part comprises a first surface of said first multilayer type capacitor, said first surface of said first multilayer type capacitor being disposed so as not to be parallel to an opposed surface of said second multilayer type capacitor.

21. The electronic component according to claim 12, wherein said guiding part comprises an arc part of at least one of said first and second multilayer type capacitors.

22. The electronic component according to claim 12, wherein at least one of said lead terminals is connected to a signal path on an electronic substrate.

23. The electronic component according to claim 12, wherein each of said first and second multilayer type capacitors comprises a guiding part adjacent to said gap.

24. An electronic component comprising:
a dielectric base body which embeds an inner electrode therein;
a first multilayer type capacitor having a first plurality of terminal parts disposed on said dielectric base body;
a second multilayer type capacitor having a second plurality of terminal parts disposed on said dielectric base body;
a first plurality of lead terminals which are connected to said first plurality of terminal parts;
a second plurality of lead terminals which are connected to said second plurality of terminal parts; and
an armoring material which covers said first multilayer type capacitor, said second multilayer type capacitor, a part of said first plurality of lead terminals, and a part of said second plurality of lead terminals,
wherein said first multilayer type capacitor is disposed adjacent to said second multilayer type capacitor with a gap separating said first multilayer type capacitor from said second multilayer type capacitor, and
wherein at least one of said first multilayer type capacitor and said second multilayer type capacitor comprises a guiding part adjacent to said gap which is disposed so as to guide said armoring material toward said gap.

25. The electronic component according to claim 24, wherein each of said first and second multilayer type capacitors comprises a guiding part adjacent to said gap.

* * * * *